United States Patent [19]

Saito

[11] Patent Number: 5,668,829
[45] Date of Patent: Sep. 16, 1997

[54] SPREAD SPECTRUM COMMUNICATION APPARATUS

[75] Inventor: Katsuo Saito, Yokohama, Japan

[73] Assignee: Canon Kabushiki Kaisha, Tokyo, Japan

[21] Appl. No.: 392,224

[22] Filed: Feb. 22, 1995

[30] Foreign Application Priority Data

Mar. 1, 1994 [JP] Japan .................................. 6-031388

[51] Int. Cl.$^6$ .................................................. H04B 15/00
[52] U.S. Cl. ............................................ 375/208; 455/88
[58] Field of Search ............................... 375/200, 206, 375/208, 340, 367, 368; 455/69, 88, 92

[56] References Cited

U.S. PATENT DOCUMENTS

| | | |
|---|---|---|
| 4,958,359 | 9/1990 | Kato .............................................. 375/1 |
| 5,199,045 | 3/1993 | Kato .............................................. 375/1 |
| 5,260,969 | 11/1993 | Kato et al. ..................................... 375/1 |

*Primary Examiner*—Stephen Chin
*Assistant Examiner*—Joseph Roundtree
*Attorney, Agent, or Firm*—Fitzpatrick, Cella Harper & Scinto

[57] ABSTRACT

A spread spectrum communication apparatus comprises a correlator for correlating a received signal and a reference signal, a synchronizing circuit for synchronizing codes for spread spectrum communication according to a correlation output of the correlator, a controller for controlling a transmission power according to the output of the correlator, and a detector for detecting the output of the correlator. The synchronizing circuit synchronizes the codes according to the output of the correlator detected by the detector. The controller controls the transmission power according to the output of the correlator detected by the detector.

20 Claims, 5 Drawing Sheets

SPREAD SPECTRUM COMMUNICATION APPARATUS

BACKGROUND OF THE INVENTION

1. Field of the Invention

The invention relates to a spread spectrum communication apparatus having a transmission power control function.

2. Related Background Art

A radio communication system is influenced by a fading which occurs in a space or an interference from another radio communication system and has a possibility such that the self radio communication state deteriorates.

Therefore, when a propagating state of a space, namely, a line state is good, a transmission power of the self transmission unit is reduced to thereby decrease an interference on another system. When the line state is bad, by increasing the transmission power, the interference on another system is relatively decreased, thereby coping with the fading.

FIG. 2 shows such an example.

In FIG. 2, reference numeral 1 denotes a radio apparatus; 2 a transmission unit; 3 a reception unit; 4 a duplexer; 5 and 7 antennas which are commonly used for both of the transmission and reception; 6 a radio apparatus; 8' a duplexer; 9 a reception unit; 10 a transmission unit; 11 a reception level detection processing circuit for detecting a reception level in the reception unit 9 and transmitting to the radio apparatus 1; and 12 a transmission power control circuit for receiving reception level information from the reception level detection processing circuit 11 of the radio apparatus 6 and controlling the transmission power of the transmission unit 2 of the radio apparatus 1.

A construction of the reception unit 9 in FIG. 2 will be further described in more detail. In FIG. 3, reference numeral 13 denotes, for example, an LNA (low noise amplifier); 14 a frequency converter; 15 a local oscillator; 16 a BPF (band pass filter); 17 an IF (intermediate frequency) amplifier; and 18 a detection circuit.

The received signal is amplified by the low noise amplifier 13 and is frequency converted by the local oscillator 15 and frequency converter 14 and is amplified to a predetermined signal by the IF amplifier 17 through the BPF 16.

The amplified signal is supplied to a demodulation unit (not shown) and is converted to a DC voltage according to the received signal level by the detection circuit 18 and is supplied to the reception level detection processing circuit 11.

In the conventional apparatus mentioned above, however, since the received signal is detected by using the IF (intermediate frequency) signal, in a system such as a radio LAN system such that a plurality of users commonly share the same frequency band and are identified by codes, an inconvenience such that the signals of the users other than the user who is at present communicating are also detected occurs.

There is a case where the signal cannot be detected when a noise level of the use band is increased or the like by the signals which are generated from the other transmitters in the same band.

FIG. 4 shows a construction of a conventional spread spectrum communication apparatus disclosed in U.S. Pat. No. 4,958,359.

Source data which is digital data, is spread-modulated by a spread modulator 65 by using a predetermined spread code generated by a code generator 68. The output of the spread modulator 65 is multiplied by a mixer 64 with a signal of a predetermined frequency generated by a local oscillator 67. Accordingly, the output of the mixer 64 has a predetermined intermediate frequency and it is amplified by a variable gain amplifier 63. The output of the variable gain amplifier 63 is frequency-converted by a mixer 62 and a local oscillator 66.

The output of the mixer 62 is supplied to a filter 61 where only a required band component is extracted and it is transmitted from an antenna 51 through a common unit 52.

In a receiver, a received signal from the common unit 52 is supplied to a mixer 53. Another input to the mixer 53 is a signal mixed by a mixer 58, which receives a predetermined code generated by a spread code generator 57 and a signal generated by a local oscillator 60. The local oscillator 60 generates a signal of a frequency which is shifted from a receiving frequency (frequency of carrier of a desired signal) by the intermediate frequency.

If the codes used in the transmitter and receiver for modulation and demodulation are phase-synchronized, an intermediate signal having a band width corresponding to the source data is produced at the output of the mixer 53. The output of the mixer 53 is supplied to an intermediate frequency filter 55 which has a band width corresponding to the source data. An intermediate frequency signal produced by the intermediate frequency filter 55 is amplified by a variable gain amplifier 54 and the output of the variable gain amplifier 54 is applied to a demodulator 56 which demodulates the source data.

The variable gain amplifier 54 voltage-controls its gain by an AGC (automatic gain control) voltage generated by an AGC voltage generator 69, which receives the output of the variable gain amplifier 54 and controls the amplifier 54 to keep a level thereof constant.

A gain of the variable gain amplifier 63 of the transmitter is also controlled by the AGC voltage generated by the AGC voltage generator 69 provided in the receiver.

In an initial state, that is, when communication between stations has not been established, the received signal is spread by the code generated by the code generator 57 of the receiver. Accordingly, the output of the intermediate frequency filter 55 is small and the AGC voltage generator 69 controls to increase the gains of the variable gain amplifiers 54 and 63.

If a signal from other station corresponding to the receiving channel, that is, a signal corresponding to the code generated by the receiver code generator 57 is applied to the antenna 51, the output of the intermediate frequency filter 55 increases after the phase synchronization of the codes for the modulation/demodulation has been established. As a result, the output signal of the amplifier 54 increases and the AGC voltage generator 69 controls the gain of the variable gain amplifier 54 so that the output of the variable gain amplifier 54 is kept at an appropriate level. The AGC voltage also controls the transmitter variable gain amplifier 63. The AGC voltage generator 69 determines a distance to other station by the level of the received signal. If it determines that the distance is short, it lowers the level of the transmitting signal in accordance with the distance. For a near station, the transmitting signal level is low, and for a distant station, the transmitting signal level is high. Accordingly, the electric field strength at the antenna of the other station is of proper level.

On the other hand, when the signal is to be sent from the present station to, the gain of the variable gain amplifier 63 is initially controlled to a high level as described above.

Accordingly, the electric field strength at the antenna of the other station is unduely high. However, as the other station responds, the input signal to the AGC voltage generator 69 increases. As a result, the AGC voltage generator 69 controls the gain of the variable gain amplifier 63 such that the electric field strength at the antenna of the other station is at the proper level.

However, in the apparatus of FIG. 4, the transmission power cannot properly be controlled before the synchronization is accomplished between the transmission and the reception.

SUMMARY OF THE INVENTION

It is an object of the invention to rapidly and properly set a transmission power.

Another object of the invention is to properly set a transmission power before the synchronization is obtained at the start of the communication or when the synchronization is released by a fault during the communication.

Still another object of the invention is to reduce an influence on another communication apparatus by a transmission signal from an apparatus of the invention.

Further another object of the invention is to improve the reliability of the transmission power control.

Further another object of the invention is to provide a spread spectrum communication apparatus for controlling a transmission power by a signal for synchronization.

Other objects and features of the present invention will become apparent from the following detailed description and the appended claims with reference to the accompanying drawings.

DETAILED DESCRIPTION OF THE PREFERRED EMBODIMENT

Figure 1:
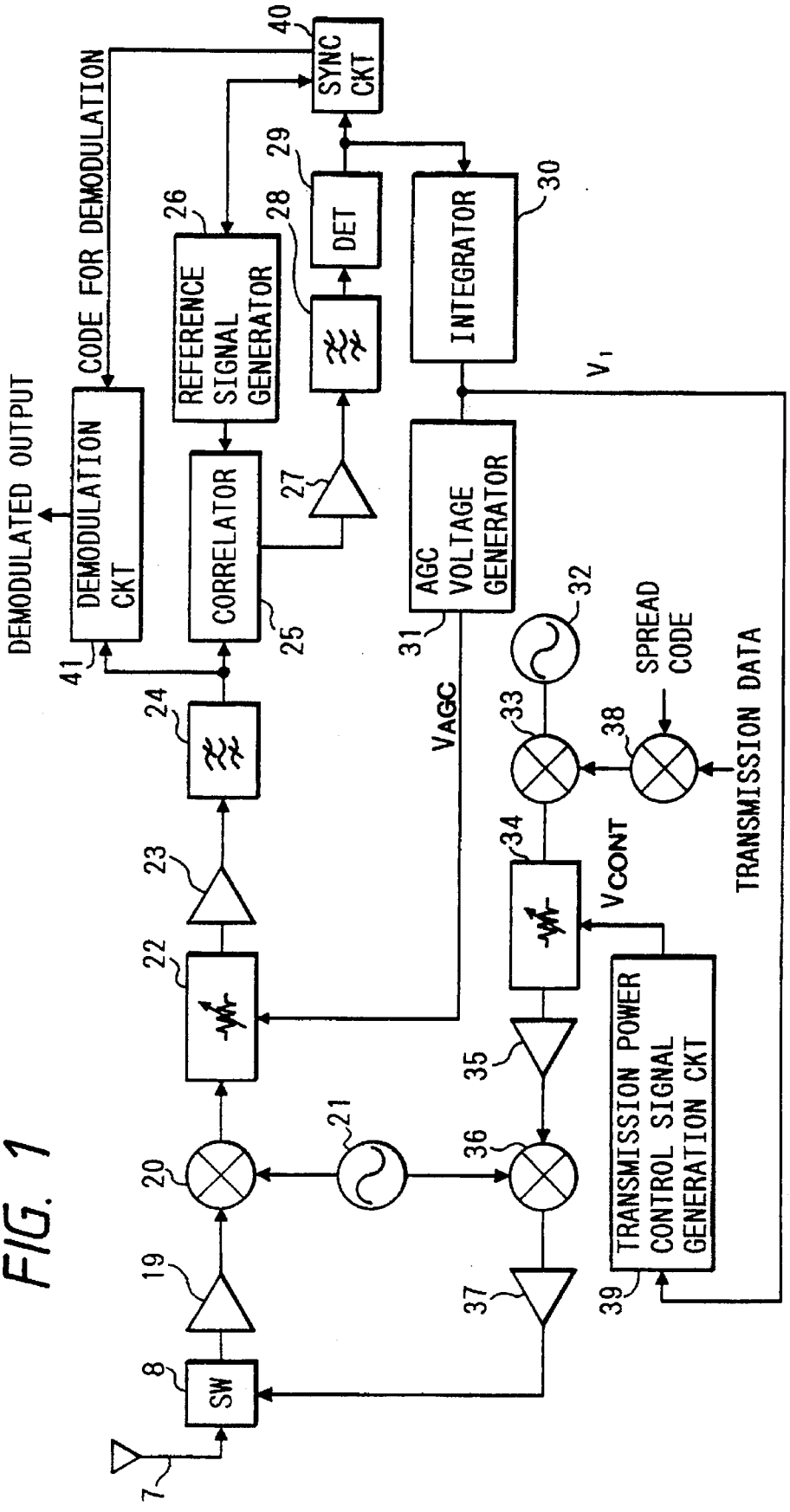
FIG. 1 is a constructional diagram of an embodiment of the invention.
Figure 2:
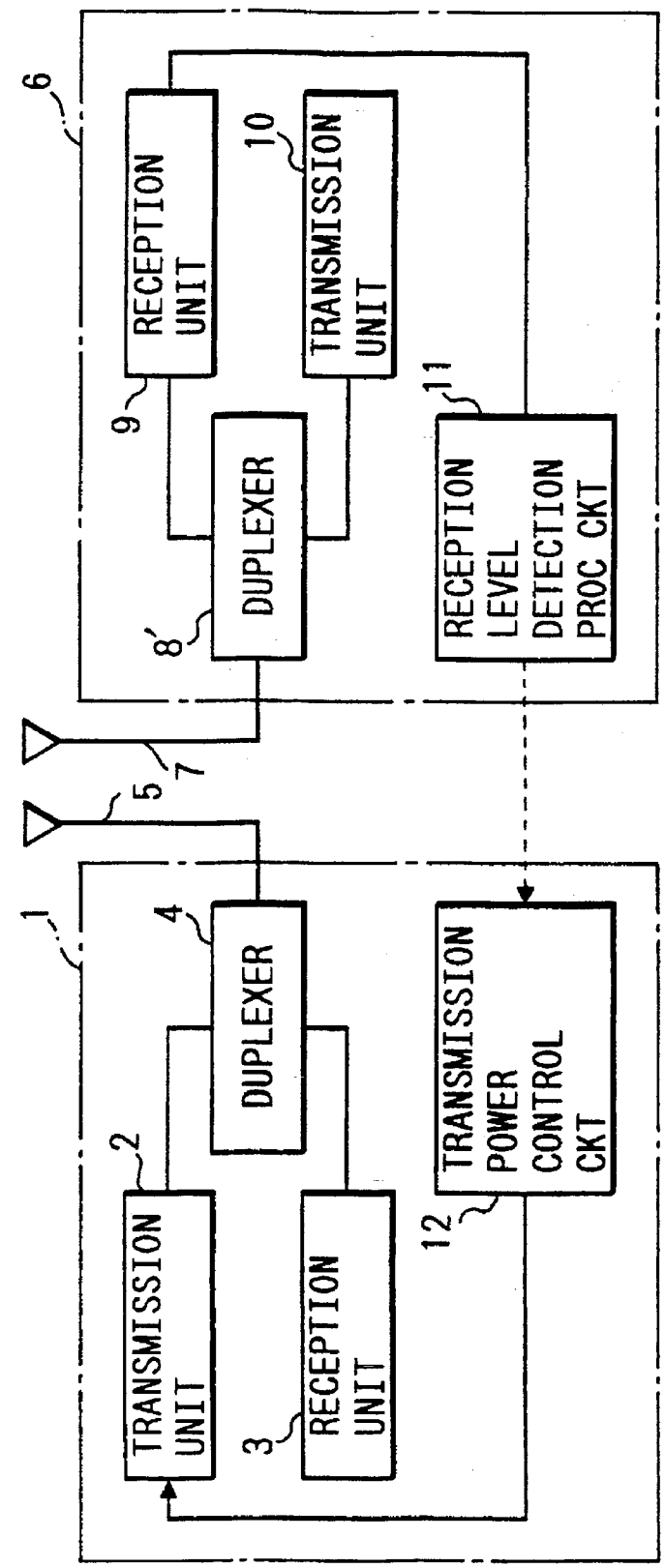
FIG. 2 is a diagram showing a conventional transmission power control.
Figure 3:
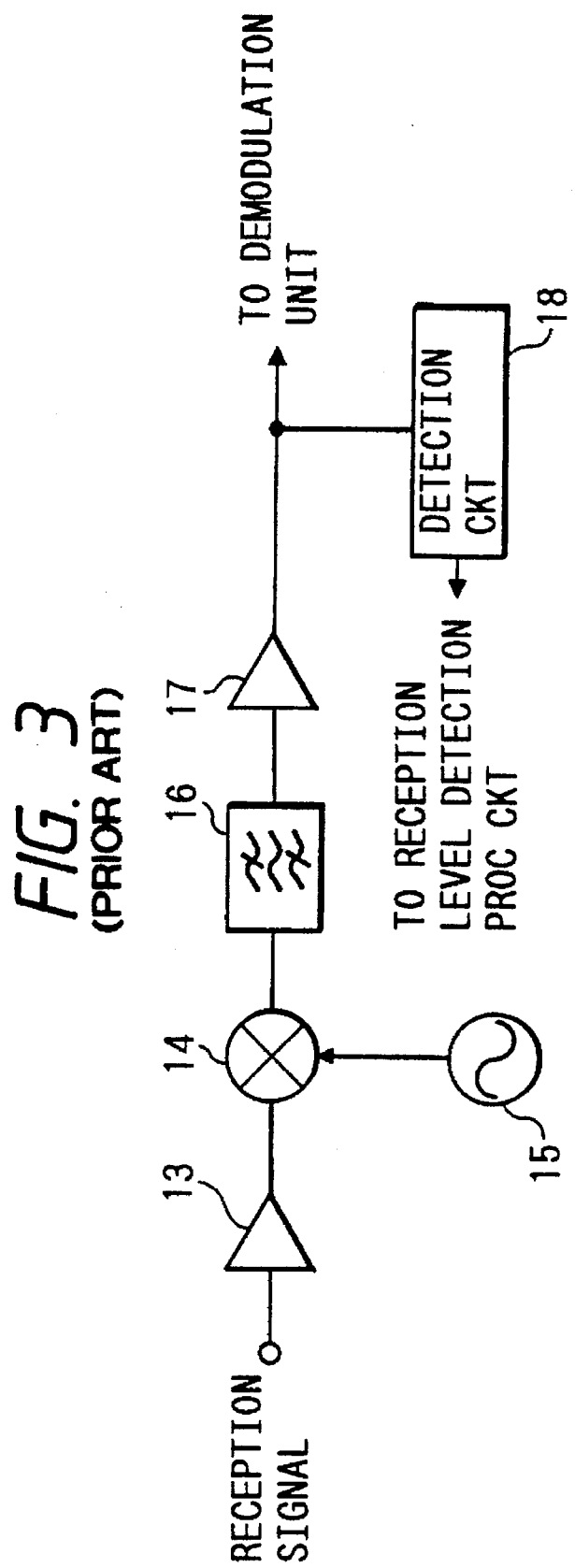
FIG. 3 is a diagram showing a conventional transmission power control signal generation.
Figure 4:
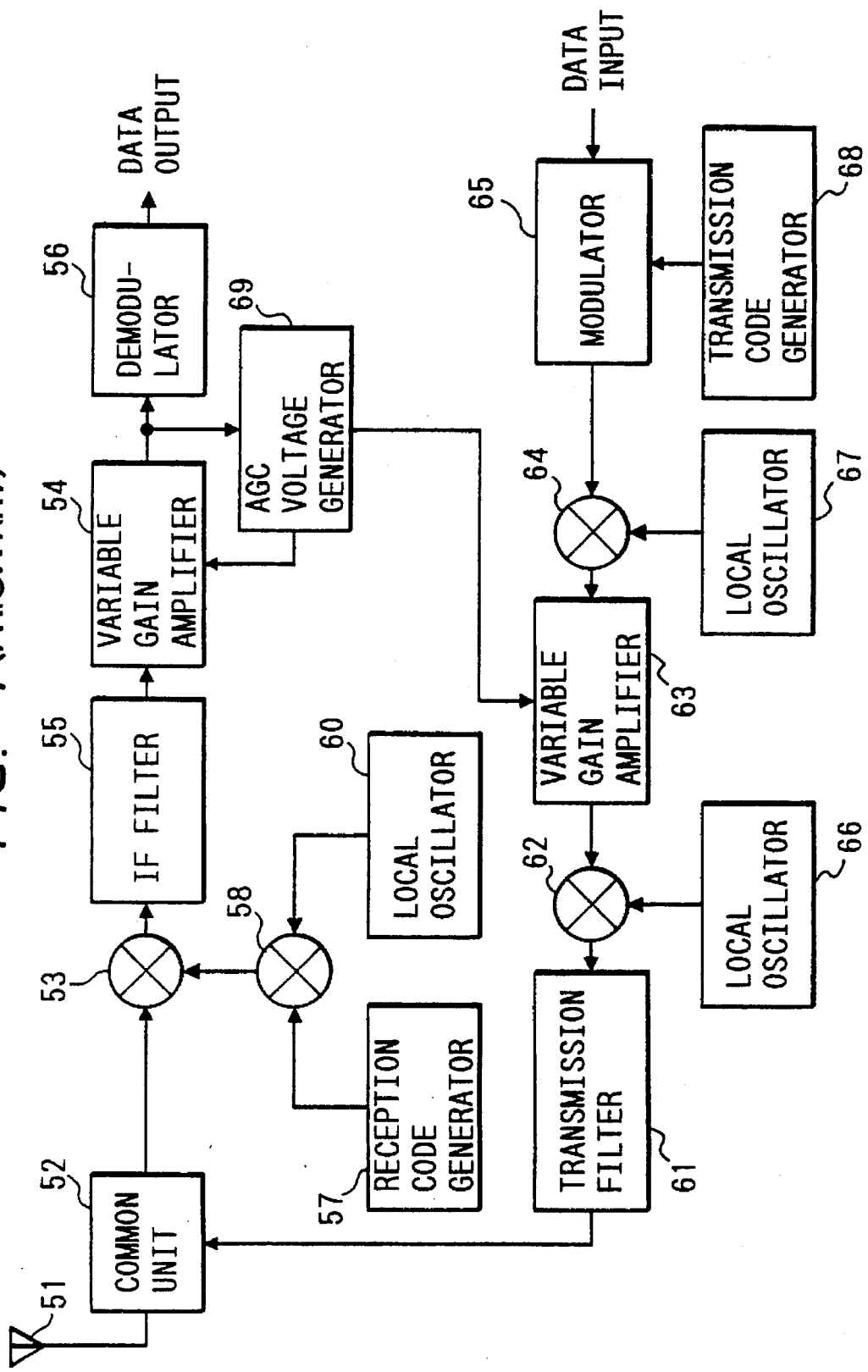
FIG. 4 is a diagram showing a circuit of a transmission power control in a conventional spread spectrum communication.

FIG. 1 is a diagram showing an embodiment of the invention.

Reference numeral 7 denotes the antenna; 8 indicates a switch for switching between the transmission and the reception; 19 an RF (radio frequency) amplifier; and 20 a frequency converter for extracting a frequency as a difference between an output from a local oscillator 21 and the received signal and setting it to an IF (intermediate frequency) received signal.

Reference numeral 22 denotes a variable attenuator whose attenuation ratio is controlled by a signal $V_{ACG}$ that is generated from an AGC voltage generator 31, which will be explained hereinlater.

Reference numeral 23 denotes an IF amplifier and 24 indicates a band pass filter having a band width of the received signal. The BPF 24 eliminates out-of-band signals included in the received signal and supplies only the desired signal to a correlator 25.

Reference numeral 26 denotes a reference signal generator.

The reference signal generator 26 generates a signal which was spread by a reference code. The reference code is a spreading code which is obtained by inverting a spreading code on the time base. Reference numeral 25 denotes the correlator which obtains a correlation peak when the received signal and the spreading code included in a reference signal that is generated from the generator 26 overlap.

Reference numeral 27 denotes an amplifier for amplifying an output from the correlator 25; 28 a band pass filter; and 29 a detection circuit for envelope-detecting the correlation output.

By amplifying the correlation output to a desired level and envelope-detecting and detecting a period of the peak value, a spreading code synchronized with the spreading code included in the received signal can be obtained by a synchronizing circuit (sync circuit) 40. Therefore, a demodulation circuit 41 performs a demodulating operation by using such a spreading code. Reference numeral 30 denotes an integrator for integrating the correlation output and produces a DC voltage according to the correlation output level.

By using the DC voltage of an output of the integrator, the AGC voltage generator 31 generates the control voltage $V_{AGC}$ so that the output of the correlator becomes constant, thereby controlling the attenuation ratio of the variable attenuator 52.

In the embodiment, the transmission power is controlled by using the output voltage $V_1$ of the integrator.

A construction on the transmission side will now be described.

Reference numeral 32 denotes a local oscillator which generates an IF frequency (for instance, 180 MHz). Reference numeral 38 denotes a multiplier for multiplying the spreading code and the transmission data. An output of the multiplier 38 is modulated by a modulator 33, so that a spreading signal is derived. The spreading signal that is outputted from the modulator 33 is attenuated to a desired value by a variable attenuator 34. After that, it is amplified by an IF amplifier 35 and is inputted to a frequency converter 36.

In the frequency converter 36, by multiplying the output of the IF amplifier 35 and the output from the local oscillator 21, it is frequency-converted. The converted signal is amplified by an amplifier 37 and is supplied to the switch 8.

The voltage which is obtained by detecting and integrating the output of the correlator 25, namely, the output $V_1$ of the integrator 30 is supplied to a transmission power control signal generation circuit 39. A transmission power control $V_{CONT}$ is generated from the generation circuit 39 by using the voltage $V_1$. By setting the attenuation ratio of the variable attenuator 34 by $V_{CONT}$ to a proper value, the transmission power is controlled.

Namely, when the received signal level is small, the correlation output is also small and the voltage $V_1$ is also reduced to the voltage according to the correlator output. Therefore, it is considered that the transmitter during the communication exists at a far position, so that the voltage $V_{CONT}$ is raised. The attenuation ratio of the attenuator 34 is, consequently, reduced and the transmission power increases.

On the contrary, when the received signal level is large, the correlation output is also increased in accordance with it, so that the voltage $V_1$ also rises.

Namely, since it is considered that the transmitter during the communication exists at a near position, by reducing the voltage $V_{CONT}$, the attenuation ratio of the attenuator 34 is increased. Therefore, it is possible to control so as to suppress the transmission power.

As a sync circuit 40, for example, a circuit disclosed in U.S. Pat. No. 5,260,969 may be used.

Figure 5:
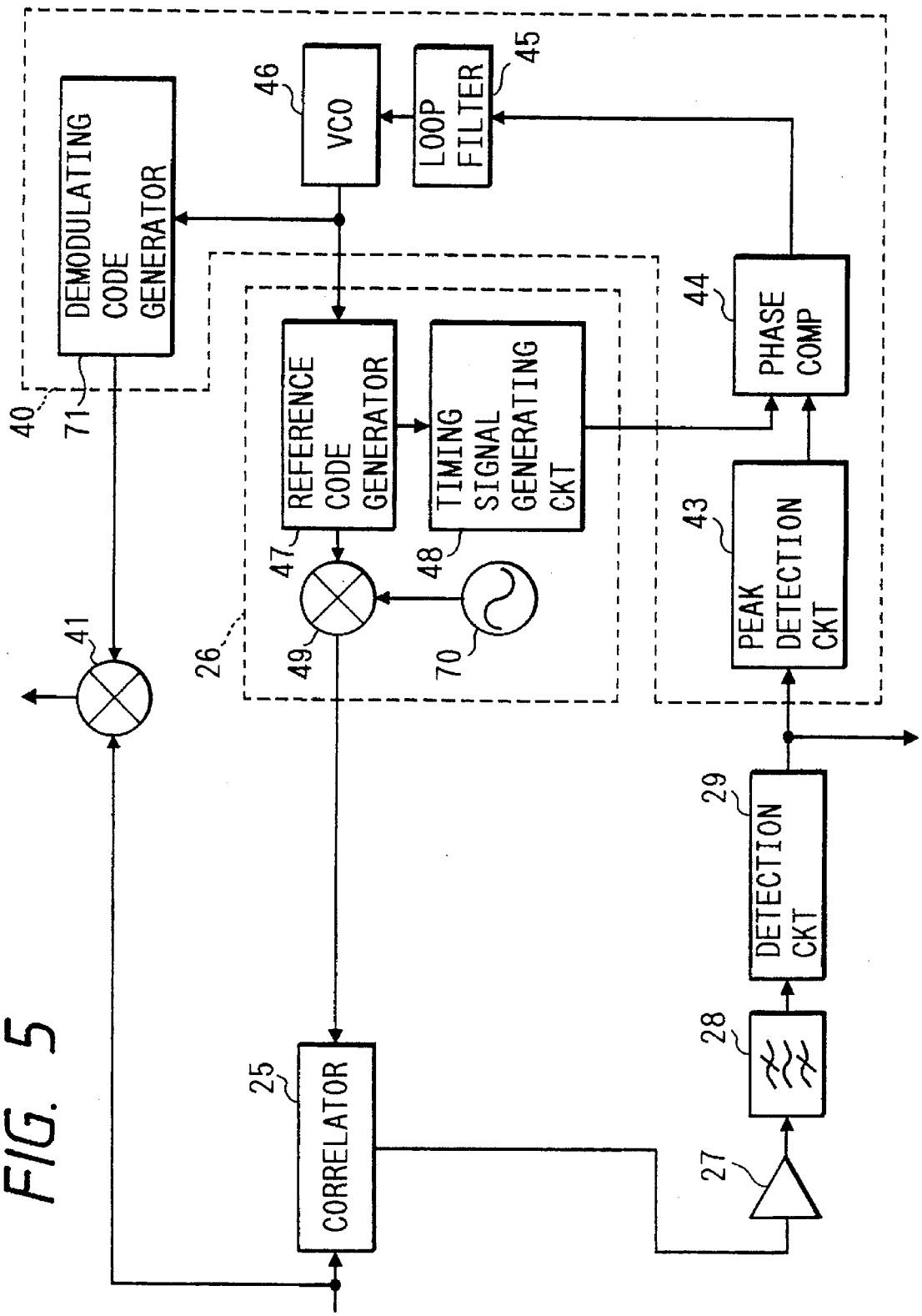
FIG. 5 is a diagram showing a construction of a synchronizing circuit of an embodiment of the invention.

FIG. 5 shows in detail the sync circuit 40 and reference signal generator 26. In FIG. 5, the component elements which are common to those in FIG. 1 are designated by the same reference numerals.

A peak detection circuit 43 detects a peak position of an output voltage from the detection circuit 29, a phase comparator 44 outputs a voltage signal corresponding to a phase difference between an output signal from the peak detection circuit 43 and that from a timing signal generating circuit 48 and defined by the leading edges of the two signals, a loop filter 45 smoothes an output from the phase comparator 44, a voltage-controlled oscillator (VCO) 46 outputs a frequency corresponding to an output voltage from the loop filter 45, and a demodulating code generator 71 generates a spreading code sequence for demodulation which is the same as the spreading code included in the received spread signal. The demodulation circuit 41 obtains a correlation between the received signal and the demodulating code.

The reference signal generator 26 comprises a reference code generator 47 for generating a reference code, the timing signal generating circuit 48 for generating a timing signal in a specific phase of a reference code generated by the code generator 47, a mixer 49, and a local oscillator 70. The reference code is obtained by inverting the spreading code included in the received spread signal on a time base.

When code synchronization is not established, the VCO 46 oscillates at a frequency close to a clock frequency of a spreading code sequence included in the received signal. The timing signal generating circuit 48 outputs a pulse at a start point of one period of a reference code sequence as an output from the code generator 47. A peak detection circuit 43 detects peak generated for each period of a spreading code of the received spread signal and outputs a pulse.

A phase comparator 44 supplies a control voltage to the VCO 46 so that the clock generated by the timing signal generating circuit 48 coincides with the clock generated by the peak detection circuit 43.

In this manner, the timing signal is synchronized with the phase of the spreading code included in the received spread signal. Therefore, code synchronization can be obtained by setting the code phase of the code generator 71 for decoding by using this timing signal.

The operation will be described in more detail. The code generator 47 generates a reference code in synchronism with a clock generated by the VCO 46. That is, the clock generated by the VCO 46 is a clock sync pulse of the reference code. In addition, a pulse generated by the timing signal generating circuit 48 is a code sync pulse of the reference code.

When no synchronization is established, the timing signal generating circuit 48 generates a pulse in synchronism with a timing at which one period of the reference code coincides with a convolution integral area of the correlator 25 of a convolver. Similarly, when no synchronization is established, the peak detection circuit 43 generates a pulse in synchronism with a timing at which the reference code coincides with the start point of the spreading code of the received signal on the convolution integral area of the correlator 25.

When synchronization is established, one period of the reference code coincides with one period of the received signal on the convolution integral area of the correlator 25. That is, the timing signal generating circuit 48 generates a pulse at the same timing as that at which the peak detection circuit 43 generates a pulse.

Therefore, the peak comparator 44 receives the pulse generated by the phase detection circuit 43 and that generated by the timing signal generating circuit 48 and adjusts a period at which the code generator 47 generates the reference pulse so that the two pulses are generated at the same timings. The phase comparator 44 applies a control voltage to the VCO 46 for generating a clock sync pulse in order to adjust a period at which the code generator 47 generates the reference pulse. That is, the phase comparator 44 receives the pulse generated by the peak detection circuit 43 and the pulse generated by the timing signal generating circuit 48 and applies a voltage to the VCO 46 so that the timings at which the two pulses are generated coincide with each other.

By resetting the code generator 71 for demodulating by using the pulse generated by the timing signal generating circuit 48, the received spread signal is de-spread to regenerate the original data.

Although the present invention has been described on the basis of the preferred embodiment, the invention is not limited to the foregoing embodiment but many modifications and variations are possible within the spirit and scope of the appended claims of the invention.

What is claimed is:

1. A spread spectrum communication apparatus comprising:

correlating means for correlating a received signal and a reference signal and for outputting a synchronizing signal based on a correlation of the received signal and the reference signal;

synchronizing means for synchronizing codes for receiving a spread spectrum signal according to the synchronizing signal outputted from said correlating means; and control means for controlling a transmission power according to the synchronizing signal outputted from said correlating means.

2. An apparatus according to claim 1, further comprising detecting means for detecting the synchronizing signal outputted from said correlating means, wherein said synchronizing means synchronizes the codes according to the synchronizing signal outputted from said correlating means and detected by said detecting means, and said control means controls the transmission power according the synchronizing signal outputted from said correlating means and detected by said detecting means.

3. An apparatus according to claim 1, wherein said control means includes integrating means for integrating the synchronizing signal outputted from said correlating means.

4. An apparatus according to claim 1, wherein said control means includes generating means for generating voltage according to voltage of the synchronizing signal outputted from said correlating means.

5. An apparatus according to claim 1, wherein the reference signal corresponds to a signal which is obtained by inverting a spreading code in the received signal on the time base.

6. An apparatus according to claim 1, wherein said synchronizing means synchronizes the codes according to code start of a reference code and the synchronizing signal outputted from said correlating means.

7. A spread spectrum communication apparatus comprising:

output means for outputting a synchronizing signal based on a correlation of a received signal and a reference signal, the synchronizing signal for synchronizing codes for receiving a spread spectrum signal; and control means for controlling a transmission power according to the synchronizing signal.

8. An apparatus according to claim 7, further comprising detecting means for detecting the synchronizing signal outputted from said output means, and wherein said control means controls the transmission power according to the synchronizing signal detected by said detecting means.

9. An apparatus according to claim 7, wherein said control means includes integrating means for integrating the synchronizing signal outputted from said output means.

10. An apparatus according to claim 7, wherein said control means includes generating means for generating voltage according to voltage of the synchronizing signal outputted from said output means.

11. An apparatus according to claim 7, wherein the reference signal corresponds to a signal which is obtained by inverting a spreading code in the received signal on the time base.

12. An apparatus according to claim 7, further comprising synchronizing means for synchronizing codes for receiving a spread spectrum signal according to the synchronizing signal outputted from said outputting means.

13. An apparatus according to claim 12, wherein said synchronizing means synchronizes the codes according to code start of a reference code and the synchronizing signal outputted from said correlating means.

14. A method for controlling a power of a transmitting spread spectrum signal, comprising steps of:

detecting a synchronizing signal outputted from a correlator which correlates a received signal and a reference signal, the synchronizing signal for synchronizing codes for receiving a spread spectrum signal; and controlling the power of the transmitting spread spectrum signal according to the synchronizing signal detected in said detecting step.

15. A method according to claim 14, wherein the power of the transmitting spread spectrum signal is controlled according to an envelope of the synchronizing signal in said controlling step.

16. A method according to claim 14, wherein the power of the transmitting spread spectrum signal is controlled according to integration of the synchronizing signal in said controlling step.

17. A method according to claim 14, wherein the power of the transmitting spread spectrum signal is controlled according to voltage of the synchronizing signal in said controlling step.

18. A method according to claim 14, wherein the synchronizing signal outputted from the correlator, which is detected in said detecting step, is obtained from time base inversion of a spreading code in the received signal.

19. A method according to claim 14, further comprising a step of synchronizing codes for receiving a spread spectrum signal according to the synchronizing signal.

20. A method according to claim 19, wherein the codes are synchronized according to code start of a reference code and the synchronizing signal.

* * * * *

UNITED STATES PATENT AND TRADEMARK OFFICE
CERTIFICATE OF CORRECTION

PATENT NO. : 5,668,829
DATED : September 16, 1997
INVENTOR(S) : Katsuo Saito

It is certified that error appears in the above-identified patent and that said Letters Patent is hereby corrected as shown below:

COVER PAGE

Under [56] References Cited, the following additional art should be listed:

| | | | |
|---|---|---|---|
| 5,533,047 | 7/1996 | Mourot, et al. | 375/208 |
| 5,434,893 | 7/1995 | Le Roy, et al. | 375/208 |
| 5,347,537 | 9/1994 | Mori, et al. | 375/208 |
| 5,257,283 | 10/1993 | Gilhousen, et al. | 375/200 |
| 5,093,840 | 3/1992 | Schilling | 375/200 |
| 4,969,160 | 11/1990 | Kingston | 375/200 |

COLUMN 2

Line 45, change "other" to --another--.

UNITED STATES PATENT AND TRADEMARK OFFICE
CERTIFICATE OF CORRECTION

PATENT NO. : 5,668,829
DATED : September 16, 1997
INVENTOR(S) : Katsuo Saito

It is certified that error appears in the above-identified patent and that said Letters Patent is hereby corrected as shown below:

<u>COLUMN 6</u>

Line 51, after "according" insert --to--.

Signed and Sealed this

Thirty-first Day of March, 1998

Attest:

BRUCE LEHMAN

*Attesting Officer*   *Commissioner of Patents and Trademarks*